United States Patent
Hamilton et al.

(10) Patent No.: US 9,622,124 B2
(45) Date of Patent: Apr. 11, 2017

(54) TECHNIQUES FOR IMPROVED ALLOCATION OF NETWORK RESOURCES USING GEOLOCATION AND HANDOVER MANAGEMENT

(71) Applicant: Viavi Solutions UK Limited, Berkshire (GB)

(72) Inventors: Adam Hamilton, Bracknell (GB); Nick Cooper, Abingdon (GB); Peter Kenington, Devauden (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 14/328,045

(22) Filed: Jul. 10, 2014

(65) Prior Publication Data

US 2016/0014648 A1    Jan. 14, 2016

(51) Int. Cl.
*H04W 36/00* (2009.01)
*H04W 36/32* (2009.01)
*H04W 72/04* (2009.01)

(52) U.S. Cl.
CPC ........ *H04W 36/0083* (2013.01); *H04W 36/32* (2013.01); *H04W 72/04* (2013.01)

(58) Field of Classification Search
CPC ......... H04W 36/0072; H04W 36/0061; H04W 36/00

(Continued)

(56) References Cited

U.S. PATENT DOCUMENTS

| 8,374,596 | B2 | 2/2013 | Thiel et al. | |
| 2001/0046879 | A1* | 11/2001 | Schramm | H04W 36/30 455/525 |

(Continued)

FOREIGN PATENT DOCUMENTS

| EP | 0 785 969 A2 | 7/1997 |
| EP | 1 659 806 A1 | 5/2006 |

(Continued)

OTHER PUBLICATIONS

"The Critical Importance of Subscriber-Centric Location Data for SON Use Cases" Arieso A JDSU Mobility Solution Version 1.0 Dec. 27, 2012.

(Continued)

*Primary Examiner* — Nathan Mitchell
(74) *Attorney, Agent, or Firm* — Harrity & Harrity, LLP (57) ABSTRACT

Techniques for improved allocation of network resources using geolocation and handover management are disclosed. In one particular exemplary embodiment, the techniques may be realized as a system for optimizing a mobile communications network. The system may comprise one or more processors communicatively coupled to a mobile communications network. The one or more processors may be configured identify a neighbors table comprising a handover priority list of target base stations prioritized based on relative signal strength or quality of service of the target base stations apparent to mobile devices in a footprint of a source base station. The one or more processors may also be configured to determine a non-obvious handover plan based on at least one of geolocation data of a mobile device, user information associated with the mobile device, and network resources data. The one or more processors may further be configured to update the handover priority list in the neighbors table based on the non-obvious handover plan to provide improved allocation of network resources and improved signal strength or quality of service to a plurality of mobile devices within the mobile communications network over a sustained period of time.

23 Claims, 6 Drawing Sheets

(58) Field of Classification Search
USPC .................................................. 455/436–444
See application file for complete search history.

(56) References Cited

U.S. PATENT DOCUMENTS

| | | | |
|---|---|---|---|
| 2004/0097234 A1* | 5/2004 | Rajkotia et al. .............. | 455/442 |
| 2004/0152480 A1 | 8/2004 | Willars et al. | |
| 2009/0318144 A1* | 12/2009 | Thomas et al. ............... | 455/434 |
| 2010/0069070 A1* | 3/2010 | Shi et al. ...................... | 455/436 |
| 2010/0075675 A1* | 3/2010 | Yang et al. ................... | 455/436 |
| 2011/0319093 A1 | 12/2011 | Flanagan | |
| 2012/0208536 A1* | 8/2012 | Cha ....................... | H04W 36/32 |
| | | | 455/434 |
| 2012/0276945 A1* | 11/2012 | Chindapol ............ | H04W 48/20 |
| | | | 455/525 |
| 2013/0083773 A1* | 4/2013 | Watfa ................ | H04W 36/0033 |
| | | | 370/331 |
| 2013/0210449 A1 | 8/2013 | Flanagan | |
| 2013/0210450 A1 | 8/2013 | Kenington et al. | |
| 2013/0225181 A1* | 8/2013 | Radulescu et al. ........... | 455/442 |
| 2014/0171102 A1 | 6/2014 | Murphy et al. | |
| 2014/0171103 A1 | 6/2014 | Murphy et al. | |
| 2014/0213263 A1* | 7/2014 | Ryan et al. ................... | 455/437 |
| 2014/0248889 A1* | 9/2014 | Van Lieshout ... | H04W 36/0083 |
| | | | 455/450 |
| 2015/0004974 A1* | 1/2015 | Karimi-Cherkandi | H04W 48/16 |
| | | | 455/435.2 |
| 2015/0148045 A1* | 5/2015 | Olvera-Hernandez | |
| | | et al. ............................ | 455/437 |
| 2015/0208314 A1* | 7/2015 | Lorca Hernando | |

FOREIGN PATENT DOCUMENTS

| | | |
|---|---|---|
| EP | 1691568 | 8/2006 |
| WO | WO 2011/028258 A2 | 3/2011 |

OTHER PUBLICATIONS

Marquez-Barja et al., "An overview of vertical handover techniques: Algorithms, protocols, and tools," Elsevier, Computer Communications, vol. 34, Issue *, ISSN 0140-3664, Jun. 2011, 15 pages.

Extended European Search Report corresponding to EP 15 176 272.1, mailed Nov. 30, 2015, 12 pages.

Extended European Search Report for European Application No. 15176272.1, issued Nov. 28, 2016, 7 pages.

* cited by examiner

TECHNIQUES FOR IMPROVED ALLOCATION OF NETWORK RESOURCES USING GEOLOCATION AND HANDOVER MANAGEMENT

FIELD OF DISCLOSURE

The present disclosure relates to network optimization, and more particularly, to techniques for improved allocation of network resources and improved signal strength/quality in a mobile communications network using geolocation and handover management.

BACKGROUND

Mobile communication devices, such as smart phones, tablets, and other electronic hand-held devices, are becoming increasingly popular. In order to support the growing number of mobile communications devices, wireless communications systems employ radio network subsystems with macro cells using one or more high-powered base stations. Although advances in technology have made it possible for these base stations to cover relatively large geographical areas to improve mobile communications, this is a one-size-fits-all approach that may not adequately leverage network resources to fully optimize a network for mobile communications. For instance, current systems fail to utilize detailed knowledge of individual users, their devices, habits, trends, and other specific information to allocate network resources in order to implement a more efficient, focused, and customized network plan. In view of the foregoing, it may be understood that there may be significant problems and shortcomings associated with current solutions and technologies for network optimization and efficiently and effectively allocating network resources.

BRIEF DESCRIPTION OF DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

DETAILED DESCRIPTION OF EMBODIMENTS

Reference will now be made in detail to exemplary embodiments, examples of which are illustrated in the accompanying drawings. It should be appreciated that the same reference numbers are used throughout the drawings to refer to the same or like parts. It should be appreciated that the following detailed descriptions are exemplary and explanatory and are not restrictive.

Exemplary embodiments may provide a system and method for network optimization using geolocation and handover management. That is, exemplary embodiments may, among other things, improve network coverage by allocating network resources based on geolocation and/or geolocation-derived information to enhance telecommunications and provide a network plan to improve performance of mobile communications.

As described above, providing high-powered base stations to cover relatively large geographical areas may improve mobile communications, but this approach may be limited and may not adequately leverage network resources for network optimization.

Self-organizing or self-optimizing networks (SONs) are emerging in various forms throughout the world. In a self-optimizing network (SON), various mechanisms may be used to determine whether or not a network is performing optimally for a given set of traffic conditions. A base station or base transceiver station (BTS) may contain configuration parameters that control various aspects of a cell site. Each of these parameters may be altered to change network behavior, based on observations of both the base station itself, measurements at the mobile station or handset, or other acquired data. For example, a self-optimizing network (SON) may automatically alter various network parameters if such changes would lead to a better user experience for some or all users. For instance, the parameters that may be adjusted may include: reconfiguring a direction an antenna is pointing, adjusting a tilt angle of an antenna, or manipulating one or more handover parameters (e.g., a device of a voice user on a heavily-used 3G network may be "encouraged" to handover to a GSM network base station in order to free up 3G resources for devices of existing or new data users on the network).

A self-optimizing network (SON) may use automated neighbor relations (ANR), which involves providing user equipment (UE) with a "neighbor relations" table that lists "neighbors" to help guide and identify "neighboring" cells to which handover may be achieved successfully. Although only a single table is typically generated by each BTS, irrespective of the UE's location within the cell, the neighbor relations table may be used by the UE, in the ranking order generated by the BTS, to search for and identify a suitable cell for handover. In a typical scenario, a neighbor relations table lists and ranks potential handover candidates purely based on signal strength or signal quality since a UE may not have the time to search through the entire list before being "compelled" (for example, by a declining signal quality) to handover to a new BTS (for example, with the best signal quality). Thus, the ranking order provided by the BTS site, via the neighbor relations table, may therefore be an important component of network optimization. It should be appreciated that ideal target cells for UEs may vary according to locations of UEs across the source cell (BTS) footprint. As a result, for each UE, many of the target cells on the list may be unobtainable, and the neighbors table may therefore be a list of suggestions of one or more "good" potential handover choices for every UE served.

It should be appreciated that the fact that a neighbor appears in a table at all is itself an important feature for network optimization. For example, a BTS may potentially exclude "good" handover candidates (e.g. "good" from a signal strength or quality perspective) from the neighbors table according to embodiments of the present disclosure. In conventional networks, a neighbors table may include all potential handover candidates, judged purely on signal strength or signal quality. However, in the network as described herein, some of these handover candidates may be (artificially) removed entirely from the list (as an alternative to being deliberately ranked lower) in order to provide further customization to network optimization.

A self-optimizing network (SON) may also incorporate load balancing techniques as well. Together with a neighbors list, for example, load balancing may help influence where and when handover should take place, based on overall usage of the network by all users. In this way, users may be appropriately distributed across various sectors to relieve congestion on popular cells. In some scenarios, further distribution may be made across various network layers, if such network layers exist. For example, these layers may include cell types (e.g., microcells, femtocells, macrocells, etc.), air interface types (e.g., 2G, 3G, 4G, etc), or other network layers.

Because users are highly mobile, a self-optimizing network (SON) may also seek to ensure that fast-moving users do not waste network resources by handing over to a microcell for a very short time, before handing back to the macro layer. Even though the microcell may have offered the best signal strength or quality of service (QoS) for that short period, these transitional handovers may create undue congestion and may be inefficient. In this scenario, the amount of network traffic consumed by the handover process versus the amount of user data transferred makes such handovers to small cells not very worthwhile.

Figure 1:
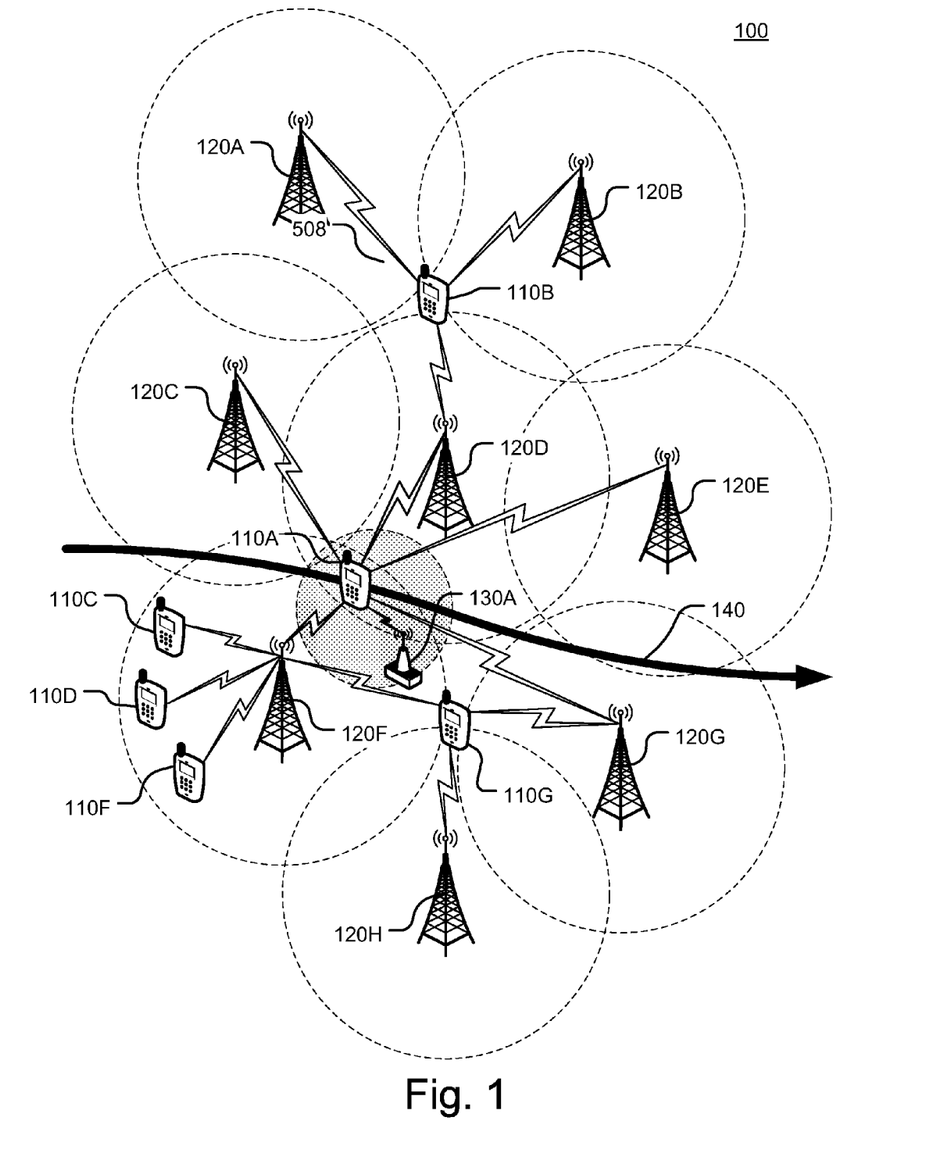
FIG. 1 depicts a system architecture for improved allocation of network resources using geolocation and handover management, according to an exemplary embodiment.

FIG. 1 depicts a system architecture for improved allocation of network resources using geolocation and handover management, according to an exemplary embodiment. It should be appreciated that system 100 is a simplified view of a network which may include additional elements that are not depicted. As illustrated, the system 100 may include an exemplary wireless network. In this example, there may be mobile communications devices 110A-110G communicatively coupled to one or more Base Transceiving Stations (BTS) 120A-120H or small cells 130A within the network. Each BTS 120A-120H may be monitored and controlled by one or more Base Station Controllers (BSC) (not shown), which in turn may be connected to various networks and/or servers of a service provider, for example, via a Mobile Communications Center (MCC) (not shown).

The small cell 130A may comprise any low-powered radio access node that is "smaller" (in terms of its coverage area and/or its capacity to serve users) compared to a macrocell, and may further be communicatively coupled to the one or more Base Transceiving Stations (BTS) 120A-120H. The small cell 130A may include, but is not limited to, femtocells, picocells, microcells, or other device that uses distributed radio technology to enhance a network coverage area. It should be appreciated that the mobile communications devices 110A-110G may also be communicatively coupled to GPS satellites (not shown) or other various systems, networks, or components useful to the mobile communications devices 110A-110G.

The mobile communications devices 110A-110G may include a variety of communications systems and/or devices. For example, such systems and/or devices may include desktop computers, laptops/notebooks, tablets, personal digital assistants (PDA), smart phones, wireline phones, cellular phones, mobile phones, satellite phones, MP3 players, video players, personal media players, personal video recorders (PVR), watches, gaming consoles/devices, navigation devices, televisions, printers, fitness devices, medical devices, and/or other devices capable of receiving and/or transmitting signals. It should be appreciated that a mobile communications devices 110A-110G may be used independently or may be used as an integrated component in another device and/or system (e.g., an automobile).

Base Transceiving Stations (BTS) 120A-120H may include radio transceivers that define a cell or a sector within a cell and may coordinate radio-link protocols with a mobile communications devices 110A-110G. The BTS 120A-120H may also provide a networking component of a mobile communications system from which signals are sent and received. BTS 120A-120H may be controlled and monitored by one or more Base Station Controllers (BSC) to provide communication over a network. The network may be the Internet, a network wholly or partly owned by the mobile communications network operator, or one or more other networks utilized for connecting various network providers and/or clients and allow for mobile communications between various mobile communications devices. As described above, the BTS 120A-120H may comprise configuration parameters that control various aspects of a cell site, where each of these parameters may be altered to change network behavior, based on observations of both the base station itself, measurements at the mobile station or handset, or other acquired or generated data.

It should be appreciated that while configuration parameters are described herein as being tuned to alter network behavior and suggest potential handovers, other parameters may also be tuned beyond the neighbors table and handover priority list. For example, these may include handover margins and hysteresis parameters, timing parameters, and/or other parameters that affect handover occurrences, network resource allocations, and service quality.

The one or more BSCs may be controlled via a Mobile Communication Center (MCC) of a service provider or network operator. The Mobile Communication Center (MCC) may include a switching node that assumes the technical functions of a network switching node, for example, path searching, signal path switching, and/or processing of supplementary services. Additionally, if there is a requirement for a connection to a subscriber in a network, the request may be forwarded by the MCC to the network over a switching path. Although only one MCC is described in this example, it should be appreciated that a plurality of MCCs, and/or other similar network systems and components, may be used by one or more service providers within a network.

In order for a system 100 to provide various services to its subscribers, the MCC, for example, may access a variety of databases, which may be internal and/or external to the MCC. For example, the MCC may be communicatively coupled to a network database, which may contain data and information about base station locations, antenna types/gains/pointing angles, power output capability, capacity/capability, and/or other base-station and network resource related information. It should be appreciated that the MCC may also store this type of information itself, may share the load with other such databases, or may rely on such data to be stored entirely on these databases. The network database and/or other databases may store a variety of information. For example, the databases may store information that identifies subscribers using its service and for which service features are subscribed. The databases may store information, such as a subscriber's customer name, identification number, services, or other identifiers, whether a user's mobile communications devices 110A-110G are switched on or off, as well as device capabilities. For example, these may include which air interface standards, such as GSM, W-CDMA, LTE. etc., the mobile device may be capable of utilizing for communications. It should be appreciated that these databases may be highly robust and may further store geolocation information, geolocation-derived information, and other information suitable for customizing handover protocols.

It should be appreciated that the contents of these databases associated with the Mobile Communication Center (MCC) may be combined into fewer or greater numbers of databases and may be stored on one or more data storage systems and in more than one format. The data storage systems may be local, remote, or a combination thereof to clients systems, servers, and/or other network components. Information stored in the databases may be useful in providing additional customizations for improved allocation of network resources and/or other related services.

Communication between the various service providers and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Universal Mobile Telecommunications Systems (UMTS), Transmission Control Protocol/Internet (TCP/IP) Protocols, Long Term Evolution (LTE). Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11ac, etc., or via protocols for a wired connection, such as an IEEE Ethernet 802.3.

Referring back to FIG. 1, the system 100 depicts multiple mobile communications devices 110A-110G communicatively coupled to a variety of BTS 120A-120H. Assuming that mobile communications device 110B is quasi-static, a decision about which BTS to best serve mobile communications device 110B may be based on at least: (1) how heavily loaded BTS 120A, BTS 120B, and BTS 120D are at a given point in time, (2) a type of service being used or requested by mobile communications device 110B (e.g., data upload/download, streaming video, internet browsing, gaming, voice, SMS, etc.), (3) capabilities of each BTS 120A-120H (e.g., a GSM BTS may not be appropriate for high-speed data services), and (4) relative signal strengths of BTS 120A, BTS 120B, and BTS 120D, as recognized by the mobile communications device 110B. It should be appreciated that signal strength may also include quality of service (QoS) or other similar factors.

Unlike mobile communications device 110B, mobile communications device 110A may be moving along path 140, which may be a roadway, street, highway, sidewalk, or other travel route. In this scenario, the mobile communications device 110A may be served by BTS 120C, BTS 120D, BTS 120E, BTS 120F, BTS 120G, and/or small cell 130A. The direction and/or speed of movement may also be taken into account in any handover decision to reduce spending short periods of time assigned to a base station from which the mobile communications device 110A may be moving away. Such a determination may be based on real-time or near real-time data received from the mobile communications device 110A, historical behavior of the mobile communications device 110A or a user of the mobile communications device 110A, and/or other historical users or similarly situated users or devices.

If the mobile communications device 110A were quasi-static, the mobile communications device 110 may be best served by small cell 130A, as depicted in FIG. 1, for many of the reasons described above. For example, small cell 130A may not be used by other users, making small cell 130A a relatively dedicated cell. Further, small cell 130A may likely be capable of handling service requests of the mobile communications device 110A, and provide the best signal strength/quality relative to any other BTS 120A-120H since it may be positionally closest to the mobile communications device 110A. However, if the mobile communications device 110A is rapidly moving along path 140, which for example, may be a known path (e.g., daily commute), as shown, a handover to the small cell 130A may be not be the best decision as it may be a waste of network resources. For example, the path 140 may be a highway, and as a result, the rapidly-moving mobile communications devices may be served by the small cell 130 for only a few seconds. In this scenario, the mobile communications device 110A may be better served by remaining on the macro-network layer, for example, being served by BTS 120C and 120F and then handed over to BTS 120D, and then BTS 120G or BTS 120E as the mobile communications device traverses along the path 140.

Taking account of mobility, for example, in relation to one or more mobile communications devices in a network, may help provide a network plan in relation to neighbors and/or handover protocol. Other helpful information for improved allocation of network resources may include one or more of the following: (a) geographic locations of users within the network; (b) speed of movement; (c) direction of movement; (d) recent history of speeds and directions of users; and (e) habitual behavior with regard to location, speed, and direction; (f) importance or status of each user as customers to the network operator (e.g., VIP status, high-paying or loyal customer, etc.); (g) type of device (make, model, capability); and (h) known shortcomings in a device, such as limited frequency coverage (perhaps due to having been designed for an overseas market). These along with other geolocation information, geolocation-derived information, user related information, or network related information may also be utilized for providing improved allocation of network resources. It should be appreciated that while decisions and new network plans may be made based on information of an individual mobile communications device, it is the vast volume of conglomerated data from multiple users, their mobile devices, and their impact on the rest of the network, that allow improved network optimization.

It should be appreciated that embodiments of the present disclosure may be applied to scenarios other than just mobility. For example, embodiments may be applied to a user who would naturally handover to a congested cell (because it offers the best signal strength or signal quality). And even though this user may also be on a video call (hence consuming lots of network resources), embodiments of the present disclosure would realize that the user might be better served by a more distant (hence lower data rate) BTS, but which is less congested (hence better throughput). Overall, a reduction in data rate, for instance, may be more than adequately made up for by the improvement in throughput, thereby giving this user (and other similar users) a better experience, and also helping all users communicatively coupled to the congested site (by minimizing further congestion). Thus, even without the aspect of mobility, embodiments of the present disclosure may understand and use the users behavior, requested service type, network resources information, and/or other information to provide a better quality of service, and improved allocation of network resources.

Figure 2:
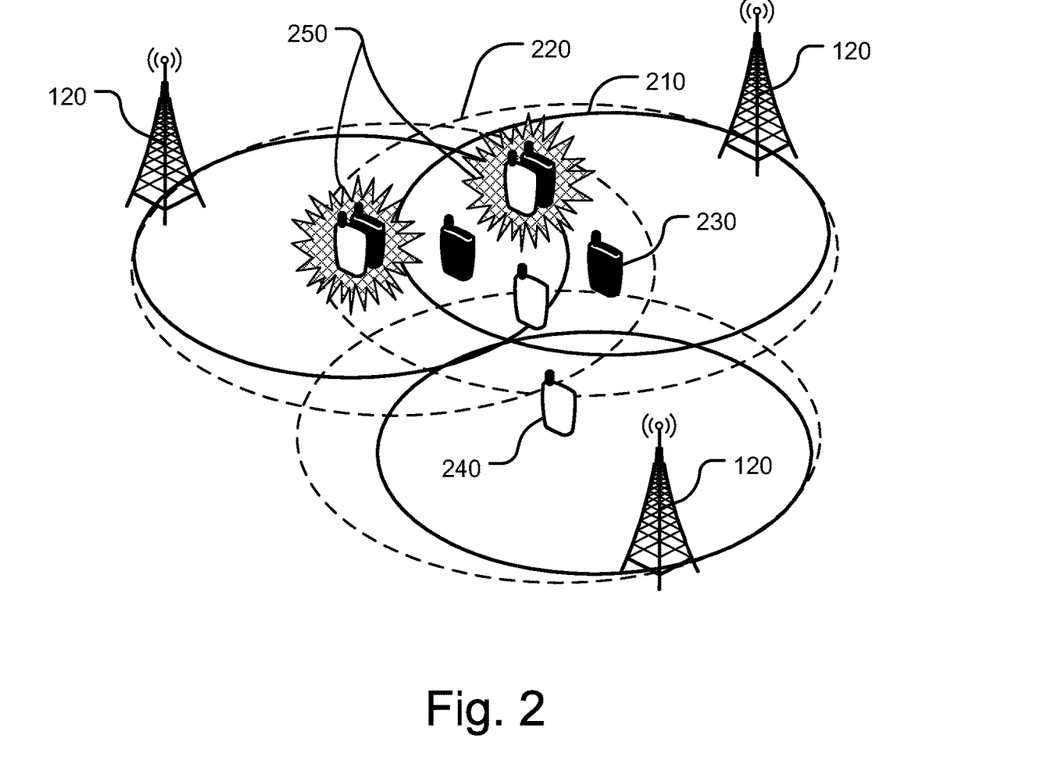
FIG. 2 depicts a diagram of multiple geographically coincident network service layers for improved allocation of network resources using geolocation and handover management, according to an exemplary embodiment.

FIG. 2 depicts a diagram of multiple geographically coincident network service layers for improved allocation of network resources using geolocation and handover management, according to an exemplary embodiment. As illustrated, a network 200 may comprise BTS 120. In the network 200, there may be a footprint of a cell on a first layer 210 and a footprint of a cell on a second layer 220. Within these footprint layers 210, 220, there may be calls placed on the first layer 230 and calls placed on the second layer 240. The layered structure of a typical cellular network and the fact that geolocation of users' mobile communications devices may allow a comparison to be made of the mobile communications experience of users of different systems or network layers at similar locations. For example, in the network 200, geographically nearby mobile communications devices of users 250 may be identified and their mobile communications experiences may be analyzed and compared. This then may enable a prediction to be made of the experiences that users would have, if they were handed over between those network layers (or identifying whether such handovers would be appropriate). The network layers may be different systems/technologies in different (or the same) frequency bands (e.g., GSM and 3G), or they could be different cell types on the same system/technology (e.g., macrocells and small cells) notionally covering (at least some of) the same geographical area.

For example, if a mobile communications device is operating on a UMTS system and it wishes to measure the suitability of a GSM network as a candidate to handover to, the mobile communications device may need to temporarily interrupt its UMTS connection in order to retune. This may be a costly endeavor (in terms of network resource usage), especially if the reason for measuring the GSM network is because the UMTS service has become too poor to sustain the call or connection. Consequently, a UMTS mobile communications device may not measure the GSM network unless it is told to do so (by the network itself), and even then, it may only measure what it has been told to measure and nothing more, so that it can report back to, and/or return to, the UMTS network as quickly as possible. The problem with this arrangement is that it may be pre-supposed that the UMTS network knows in advance what part of the GSM network a mobile communications device should measure. Embodiments disclosed herein may identify and make use of this knowledge.

For instance, single handsets, on their own, may be unable to provide sufficient information about a target layer for such inter-layer handovers to take place reliably. Mobile devices may reveal whether target details are right or wrong, not whether there is a better choice for the target.

With geolocation data incorporated, however, the information from multiple subscribers who happen to be accessing multiple layers of the network at the same geographic locations may be combined. For example, in order to determine an ideal set of GSM target cells that a UMTS cell should keep in its neighbor list, in the event that Inter-RAT (radio access technology) handovers become necessary, areas where users of the UMTS cell are found may be identified and then experiences of subscribers who happen to be using the GSM network at those same, or nearby, locations may be referenced. If the cross-reference of subscribers is taken a step further, for example, by filtering the sets of UMTS and GSM subscribers to focus on particular characteristics (e.g., high value users, highly mobile users, users of suitably equipped devices, etc.), a decision to best manage handovers (to and from) between UMTS and GSM layers may be achieved. This may likewise apply to handovers between UMTS and LTE and vice-versa, GSM and LTE and vice-versa, or for any other combination or direction of handovers between networks available to a user at his or her geographic location.

Thus, the notion of volume (of users and their network experiences), rather than considering the behavior of just a few individual users, may ultimately provide a more comprehensive pool of detailed information to more fully understand trends and behaviors, which in turn may produce insightful views of each layer's performance. As a result, a better network plan may be provided to help make better decisions for optimum network performance and service.

Accordingly, having and using knowledge of the user's location, speed or direction of movement (or absence of movement), historical habits (e.g. a particular journey at a particular time each day, on particular days, such as journey's to/from work) or the user's importance to the network operator (e.g. if the user is a VIP, a high-spending individual a network operator strongly wishes to retain, part of a major corporate client, or a user who is paying extra for better service), and the conglomeration of such data from multiple user devices, SON technologies may be enhanced. Other information, such as mobile device type/model (and hence capability), historical revenue stream, service type, etc. may help as well. For example, a user who uses his or her device mostly abroad may generate significant revenues for a network operator, despite being on a 'low-cost' domestic tariff, and thus is a more "valuable" customer. In another example, using this knowledge, a network may differentiate a customer who mostly sends text messages or surfs the Internet (not playing games) and hence could be served quite 'cheaply,' from a network resources perspective compared to a second user who habitually consumes video content. If both users are enrolled in low-cost 'all you can eat' tariffs, even on a heavily-loaded network, it may be possible to adequately serve the first user and/or throttle or deny service (in extreme cases) to the second user, in order to better provide improved network optimization.

In addition, network-level information may be used to inform handover decisions. For example, the use of geolocation of a large number of users, together with their signal strength/QoS experiences at all of the locations they have visited, amassed over a suitable period of time, may allow a network to build a comprehensive picture of what coverage is provided by which BTS and in which service category (e.g., voice, data, video, GSM, 3G, LTE, etc.) at all points in the network. This detailed network overview may give much more precise information on where particular handover decisions could make sense, relative to a map based upon the original network plan or information derived from BTS sectors in general (e.g., a given sector may be treated as a single entity, with no detailed breakdown of coverage within that sector). This level of detail may allows much better handover decisions to be made and hence a more accurate network resource utilization to take place.

Adding in these pieces of information may also allow a network operator to better serve his more important customers and/or better serve the whole community of users on his network. This information may allow an operator to make choices about how to better optimize his network to serve the types of user he most wishes to attract and retain and, consequently, maximize the revenue from a particular network configuration. It may also allow the network to better understand where to make additional investments in network capacity and to predict what impact these investments would have on revenues and hence profitability.

Figure 3:
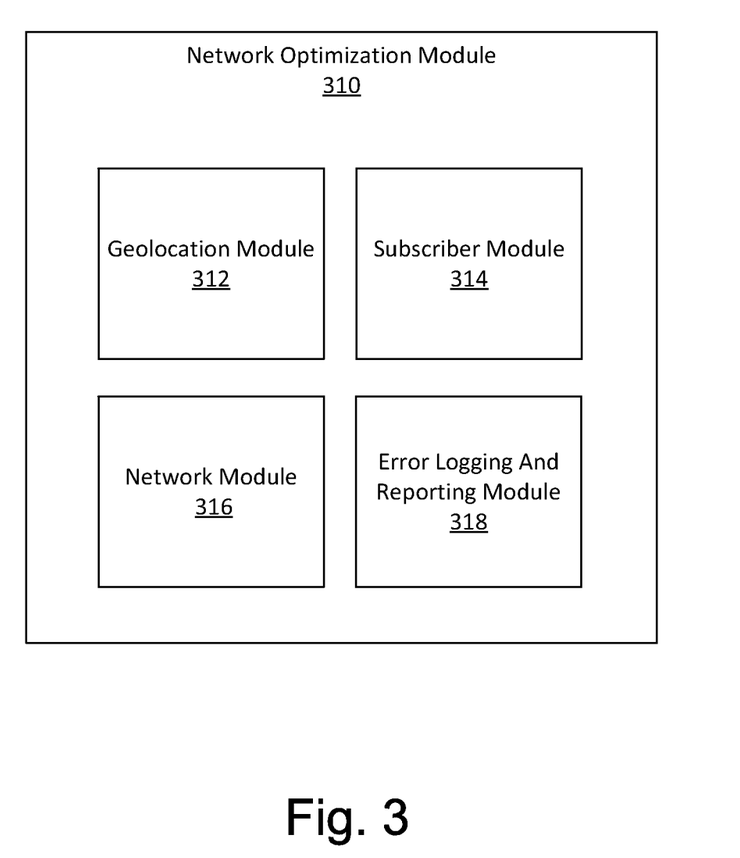
FIG. 3 depicts a module for improved allocation of network resources using geolocation and handover management, according to an exemplary embodiment.

FIG. 3 depicts a module for improved allocation of network resources using geolocation and handover management, according to an exemplary embodiment. Referring to FIG. 3, there is shown a network optimization module 310 in accordance with an embodiment of the present disclosure. As illustrated, the network optimization module 310 may contain one or more components including a geolocation module 312, subscriber module 314, network module 316, and error logging and reporting module 318.

The description below describes network elements, computers, and/or components of a system and method for optimizing a network and providing improved allocation of network resources using geolocation and handover management that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Geolocation module 312 may be used to determine geolocation or geolocation-derived data associated with a mobile device. For example, as discussed above, the geolocation module 312 may be used to receive information from a mobile device associated with geolocation, such as speed, direction of movement, etc., and may also use that information to calculate and determine where the mobile device is traveling so that this information could be further processed to provide improved allocation of network resources for one or more mobile devices in that network.

It should be appreciated that the geolocation module 312 may perform one or more geolocation techniques in accordance with at least the following: U.S. Patent Publication No. 2011/0319093 to Flanagan, entitled "Geo-location in a Wireless Communication Network," filed on Sep. 19, 2011 and published on Dec. 29, 2011; U.S. Pat. No. 8,374,596 to Thiel et al., entitled "Method and Apparatus for Deriving Pathloss Estimation Values," filed on Dec. 21, 2009 and issued on February 2013; U.S. Patent Publication No. 2013/0210450 to Kenington et al., entitled "Method and Apparatus for Geolocating Wireless Communication Unit," filed on Feb. 9, 2012 and published on Aug. 1, 2013; U.S. Patent Publication No. 2013/0210449 to Flanagan, entitled "Mobile Geolocation," filed on Sep. 19, 2011 Feb. 9, 2012 and published on Aug. 1, 2013; U.S. Patent Publication No. 2014/0171102 to Murphy et al., entitled "Mobile Geolocation," filed on Dec. 18, 2012 and published on Jun. 19, 2014; and U.S. Patent Publication No. 2014/0171103 to Murphy et al., entitled "Method and System for Mobile Reference Signature Generation," filed on Dec. 18, 2012 and published on Jun. 19, 2014, all of which are herein incorporated by reference in their entireties.

Subscriber module 314 may be used to identify user/subscriber specific information. For example, the subscriber module 314 may identify a type of mobile device, which may in turn provide information about its various capabilities. The subscriber module 314 may also determine current service requests, e.g., voice or data. This information may be used to further provide improved allocation of network resources and improved signal strength/quality for one or more mobile devices in that network.

Network module 316 may be used to identify past, current, and future capabilities of network resources and allocate and reallocate these resources to better optimize a network for a plurality of mobile devices on the network.

Error logging and reporting module 318 may produce logs, reports, or other information associated with improving allocation of network resources using geolocation and handover management. It should be appreciated that any or all of these modules 310-318 may be communicatively coupled to one or more databases or storage/memory units (not shown), locally or remotely, so that information may be stored for later use or processing.

Figure 4:
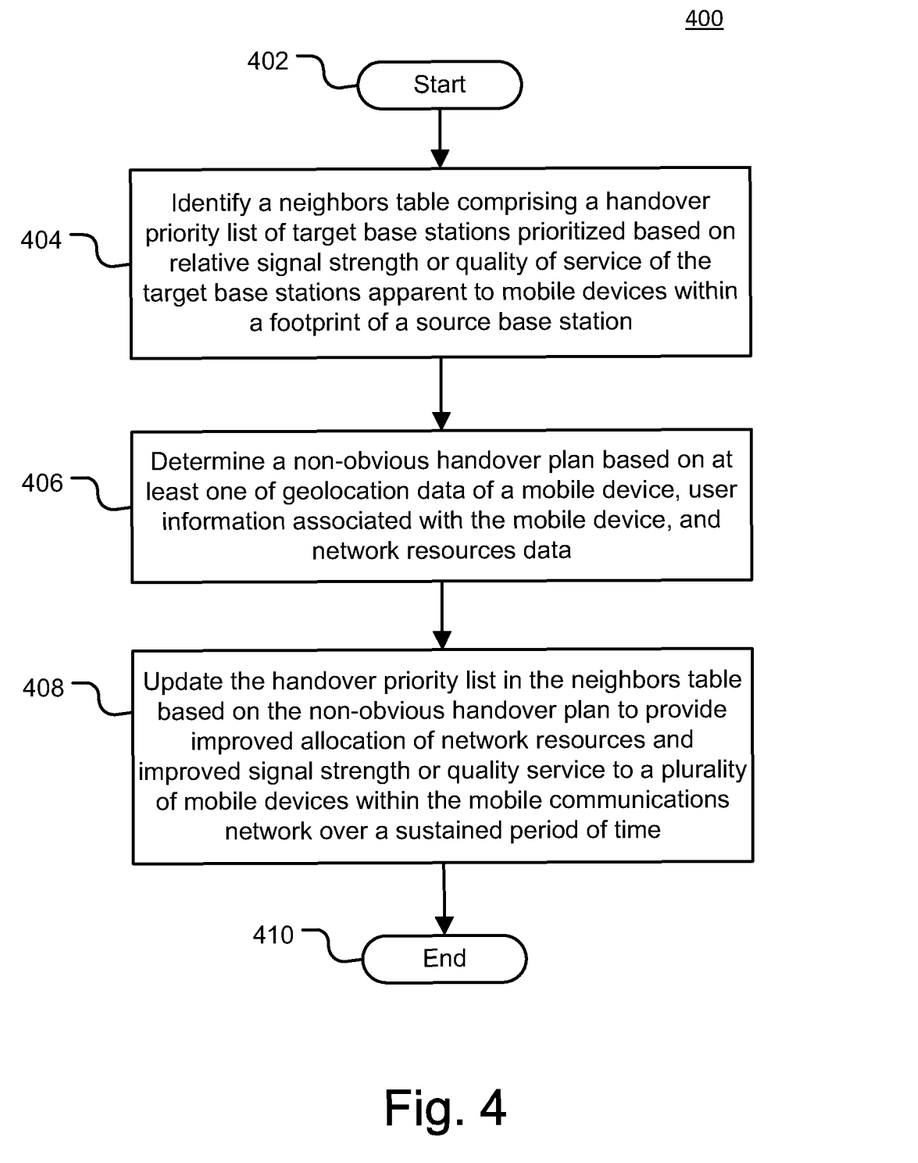
FIG. 4 depicts a flowchart of a method for improved allocation of network resources using geolocation and handover management, according to an exemplary embodiment.

FIG. 4 depicts a flowchart of a method for improved allocation of network resources using geolocation and handover management, according to an exemplary embodiment. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least architecture 100 in FIG. 1, network layers 200 in FIG. 2, and module 310 in FIG. 3, by way of example, and various elements of system 100 are referenced in explaining the exemplary method of FIG. 4. Each block shown in FIG. 4 represents one or more processes, methods, or subroutines carried in the exemplary method 400. A non-transitory computer-readable medium comprising code, which when performed by a computer may perform the acts of the method 400 may also be provided. Referring to FIG. 4, the exemplary method 400 may begin at block 402.

At block 404, a neighbors table may be identified. The neighbors table may comprise a first handover priority list of base stations prioritized based on current signal strength or quality of service. For example, a neighbors table comprising a handover priority list of target base stations prioritized based on relative signal strength or quality of service of the target base stations apparent to mobile devices in a footprint of a source base station may be identified.

At block 406, a non-obvious handover plan may be determined based on at least one of geolocation data of a mobile device, user information associated with the mobile device, and network resources data. The geolocation data may comprise speed, direction of movement, historic location data, current location data, geolocation data of other mobile devices in similar locations and situations, travel path prediction information, or a combination thereof. The mobile device may comprise a desktop computer, a laptop or notebook computer, a tablet computer, a wireless phone, a personal digital assistant (PDA), a multimedia device, a video player, a watch or clock, a gaming device, a navigation device, a television, a printer, an automobile, a fitness device, and/or a medical device. The network resources data may comprise data associated with base station type, capacity, availability, location or nearness to the mobile device, coverage area, and anticipated usage.

The user information may comprise a type of service, device type, device capabilities, and/or user status. For example, the type of service may be determined to be voice service or data service. In some embodiments, the user status may be determined to be a VIP status. In this example, VIP status may be assigned to a high-spending customer, a loyal customer, a corporate executive, and/or a pay-for-upgrade customer.

At block 408, the handover priority list in the neighbors table may be updated based on the non-obvious handover plan to improve allocation of network resources and provide improved signal strength or quality of service to a plurality of mobile device within the mobile communications network over a sustained period of time. For example, in some embodiments, it should be appreciated that in the event the speed of the mobile device surpasses a predetermined speed threshold, the non-obvious handover plan may remove or deprioritize small cell handover from the handover priority list. Although handing over to a small cell may provide the mobile device with the best signal quality at that moment, the coverage of a small cell is limited. Therefore, handing over to a macrocell, such as a BTS with larger coverage area in the area where the fast-moving mobile device is headed, provides a better, non-obvious solution over a longer period of time.

In some embodiments, if the type of service is determined to be voice service, the non-obvious handover plan may prioritize available voice-capable base stations on the priority list. In other words, base stations that provide data-only service may be removed or deprioritized so that the mobile device does not waste time trying to connect with base stations that do not match the type of service required, even if they may have strong strength of signals. Similarly, if the type of service is determined to be data service, the non-obvious handover plan may prioritize available data-capable base stations on the priority list, or remove/deprioritize available base stations that provide voice-only services It should also be appreciated that if the user status is determined to be a VIP status, a VIP action may be performed. VIP status may be assigned to a high-spending customer, a loyal customer, a corporate executive, a pay-for-upgrade customer, combination thereof, or some other identifier. The VIP action may free up network resources for the VIP user without losing network connectivity to a cell. In some embodiments, the VIP action may include, but not be limited to: (a) migrating non-VIP users to other network resources; (b) throttling data rate and services available to non-VIP users; (c) moving or rescheduling non-VIP users from network access; and (d) preventing non-VIP users from handover to a heavily used cell to which the VIP user is communicatively coupled. Other VIP actions may also be considered for providing improved network optimization.

At block 410, the method 400 may end.

Figure 5A:
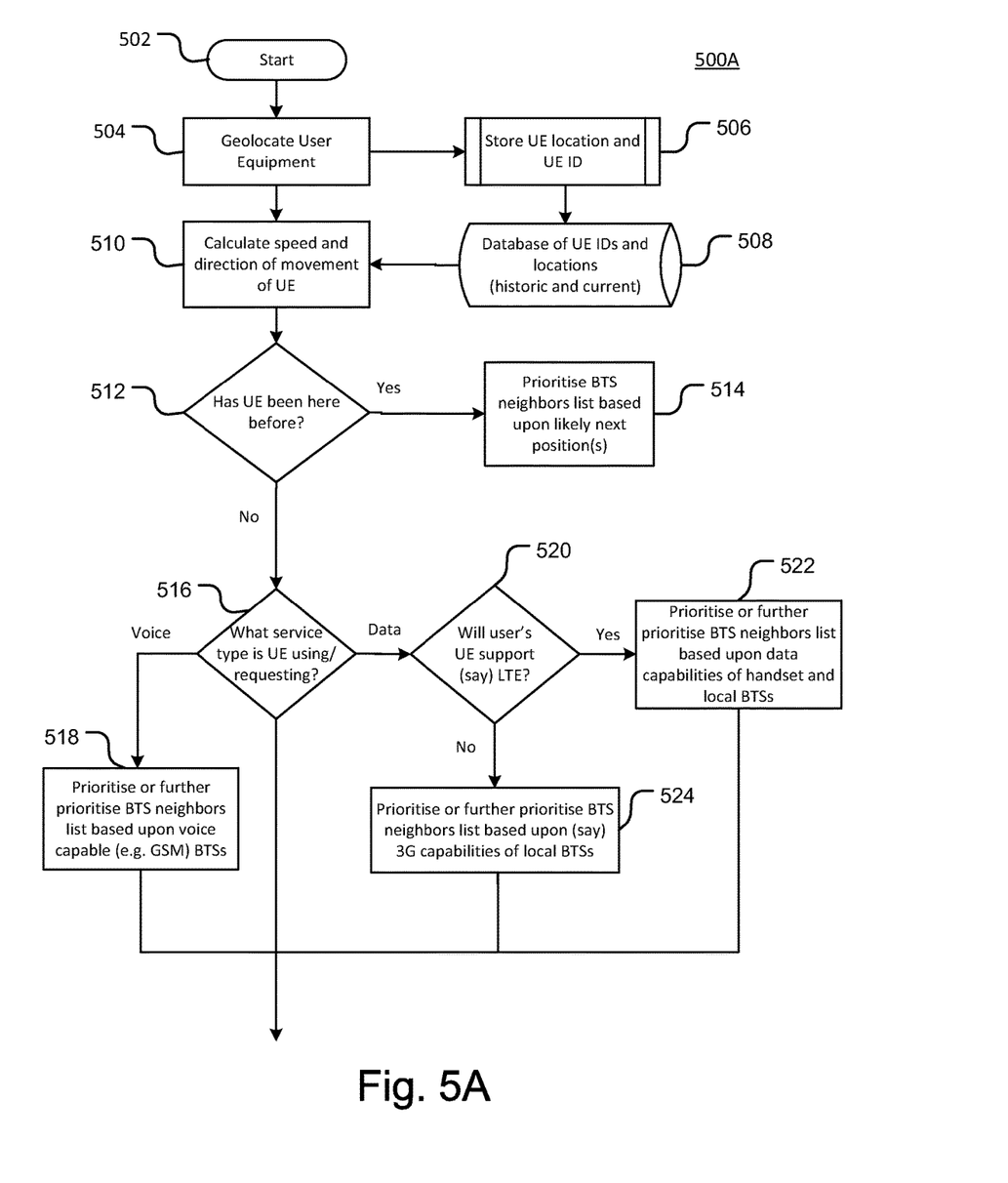
FIGS. 5A-5B depict a flowchart of a method for improved allocation of network resources using geolocation and handover management, according to an exemplary embodiment.
Figure 5B:
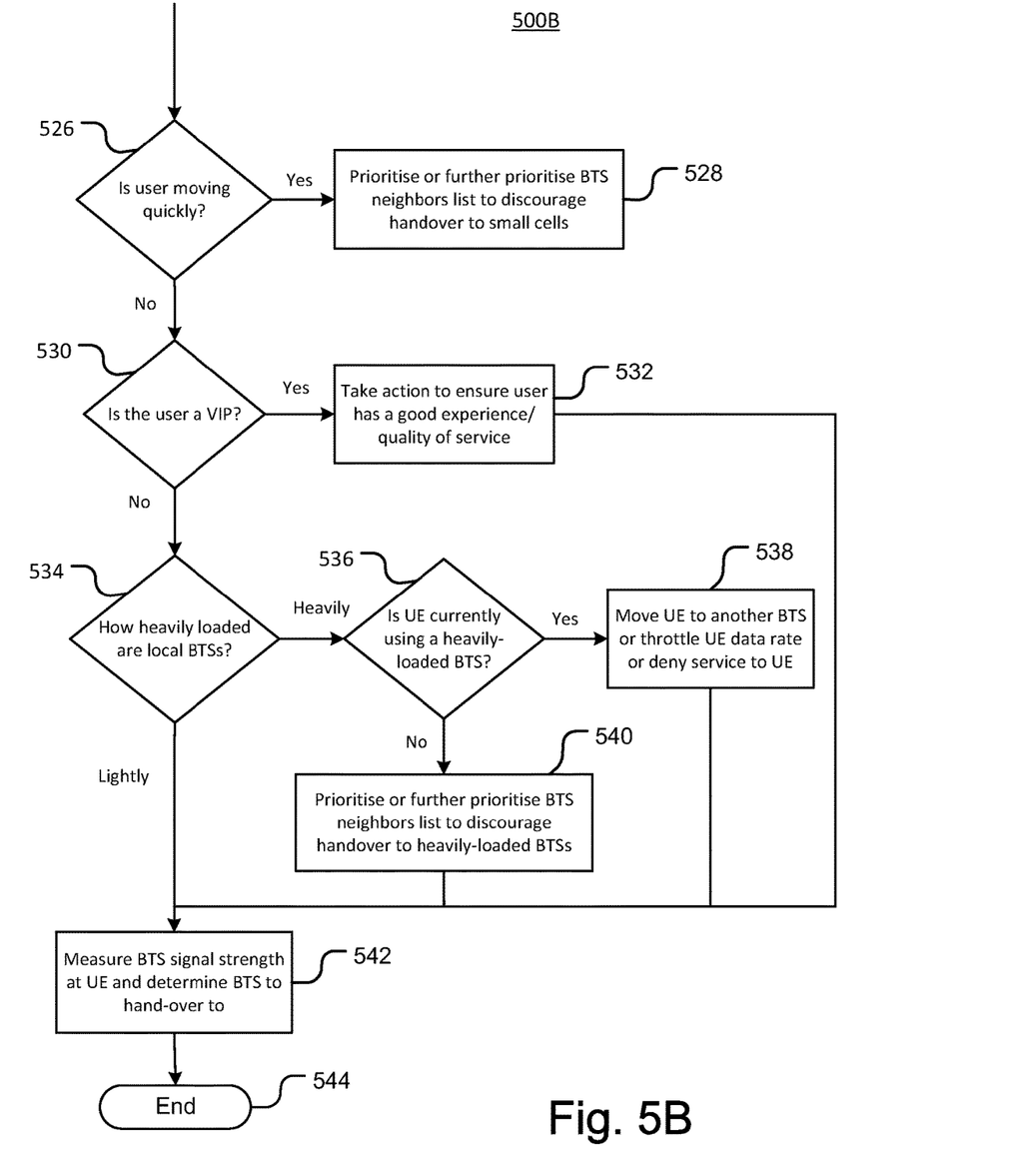

FIGS. 5A-5B depict a flowchart of a method for improved allocation of network resources using geolocation and handover management, according to an exemplary embodiment. The exemplary methods 500A-500B are provided by way of example, as there are a variety of ways to carry out methods disclosed herein. The methods 500A-500B shown in FIGS. 5A-5B may be executed or otherwise performed by one or a combination of various systems. The 500A-500B are described below as carried out by at least architecture 100 in FIG. 1, network layers 200 in FIG. 2, and module 310 in FIG. 3, by way of example, and various elements of system 100 are referenced in explaining the exemplary methods of FIGS. 5A-5B. Each block shown in FIGS. 5A-5B represents one or more processes, methods, or subroutines carried in the exemplary methods 500A-500B. A non-transitory computer-readable medium comprising code, which when performed by a computer may perform the acts of the methods 500A-500B, may also be provided. Referring to FIGS. 5A-5B, the exemplary methods 500A-500B may begin at block 502.

At block 504, user equipment (UE) may be location using geolocation. At block 506, geolocation data associated with the UE may be stored. For example, the geolocation data and other related information, such as UE identity, capability, etc., may be stored in one or more databases, as depicted at block 508. Furthermore, at block 508, such data may be compiled to generate historic, behavioral, trends in UE, in addition to current information associated with the UE.

At block 510, speed and/or direction of movement of the UE may be calculated using the geolocation data. At block 512, the method 500A may inquire whether the UE has been at that location before. Alternatively, method 500A may inquire whether the UE (or other UEs) have been in similar situations, and/or travelling at a similar speed, and/or with a similar direction of movement, or other trend/position derived from historical or behavioral geolocation information. At block 514, a BTS neighbors priority list may be prioritized based on a likely next position or positions of the UE.

At block 516, the method 500A may inquire what service type is being used or requested by the UE. At block 518, if voice data is being used/requested, a BTS neighbors priority list may be prioritized based on voice-capable (e.g., GSM) BTSs. At block 520, if data is being used or requested, the method 500A may further inquire what type of data service is supported by the UE, for example, LTE. For example, at block 522, if LTE data is supported by the UE, a BTS neighbors priority list may be prioritized based upon data capabilities of the UE handset and local BTSs. At block 524, if LTE is not supported by the UE, a BTS neighbors priority list may be further prioritized based other grades of data-capable (e.g., 3G, 2G) BTSs.

At block 506, method 500B (which may continue from method 500A) may inquire whether the user (as determined by the geolocation of the UE) is moving quickly (e.g., surpassing a predetermined threshold). At block 528, if the speed of the user surpasses the predetermined threshold, a BTS neighbors priority list may be prioritized to discourage handover to small cells or other cells that have limited coverage area.

At block 530, the method 500B may further inquire whether the user has VIP status. At block 538, if the user is identified as having VIP status, a VIP action may be taken to ensure he or she has a good quality of service experience, as described above.

At block 534, the method 500B may further inquire of the network regarding what the resource availability or capabilities are at any given time. At block 536, if the BTSs of the network are heavily loaded, the method 500B may further inquire whether the UE is currently using a heavily loaded BTS. At block 538, if the UE is using the heavily loaded BTS, the UE may be moved to another BTS or UE data rate may be throttled or denied service to the UE. At block 540, if the UE is not currently using a heavily loaded BTS, a BTS neighbors priority list may be prioritized to discourage handover to a heavily-loaded BTS. At block 542, if the network resources (e.g., local BTSs) are not heavily loaded to begin with, then UE handover may proceed by measuring signal strength or quality of service from each BTS listed in the neighbors list, typically in the order they appear in that list.

At block 544, the method 500B may end.

As discussed above, network-level information may be used to inform handover decisions. For example, use of geolocation of a large number of users, together with their signal strength and/or QoS experiences at various locations they have visited, amassed over a long period of time, may allow a network to build a comprehensive picture of what coverage is provided by which BTS and in which service categories (e.g., voice, data, video, GSM, 3G, LTE etc.) at multiple various points in the network. Such a detailed network overview may provide more precise information as to where particular handover decisions may make sense, relative to a map based upon the original network plan or information derived from BTS sectors in general. It should be appreciated that a given BTS sector may be treated as a single entity, with no detailed breakdown of service within that sector. Therefore, according to other embodiments, this level of detail in a geolocation system, as described herein, may provide for much better handover decisions to be made and hence a more accurate network resource utilization to take place. For example, such information may be used to develop and generate a handover map (in addition to a mere coverage map). This handover map may include various handover threshold(s) used at particular BTS sites, dynamically altering the shape of this map.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that optimizing a network using geolocation and handover management in accordance with the present disclosure as described above typically involves the processing of input data and the generation of output data to some extent. This input data processing and output data generation may be implemented in hardware or software. For example, specific electronic components may be employed in a network optimization module or similar or related circuitry for implementing the functions associated with providing improved allocation of network resources using geolocation and handover management in accordance with the present disclosure as described above. Alternatively, one or more processors operating in accordance with instructions may implement the functions associated with identifying potential malware domain names in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system comprising:
one or more processors configured to:
identify a neighbors table comprising a handover priority list of target base stations prioritized based on relative signal strength or quality of service of the target base stations;
determine multiple mobile devices that are accessing multiple layers of a network;
determine particular information regarding a mobile device, of the multiple mobile devices, based on historical habits of a user of the mobile device and one or more shortcomings associated with a limited frequency coverage of the mobile device;
determine combined information regarding the multiple mobile devices by combining the particular information with other information regarding one or more other mobile devices of the multiple mobile devices;
determine a handover plan based on the combined information regarding the multiple mobile devices;
update the handover priority list based on the handover plan; and
manage a handover of the mobile device from a source base station to one of the target base stations based on the updated handover priority list.

2. The system of claim 1,
wherein, when determining the particular information, the one or more processors are configured to:
determine the particular information based on the historical habits of the user, the one or more shortcomings associated with the limited frequency coverage of the mobile device, and network resources data, and
wherein the network resources data comprises data associated with at least one of base station type, capacity, availability, location or nearness to the mobile device, coverage area, or anticipated usage.

3. The system of claim 1,
wherein, when determining the particular information, the one or more processors are configured to:
determine the particular information based on the historical habits of the user, the one or more shortcomings associated with the limited frequency coverage of the mobile device, and a direction of movement of the mobile device, and
wherein the one or more other mobile devices are in similar locations and situations as the mobile device.

4. The system of claim 1, wherein, when determining the handover plan, the one or more processors are configured to:
determine that a speed of the mobile device satisfies a speed threshold, and
determine the handover plan that removes or deprioritizes small cell handover from the handover priority list based on determining that the speed of the mobile device satisfies the speed threshold.

5. The system of claim 1,
wherein, when determining the particular information, the one or more processors are configured to:

determine the particular information based on the historical habits of the user, the one or more shortcomings associated with the limited frequency coverage of the mobile device, and user information, and wherein the user information comprises at least one of a type of service of the mobile device, a device type of the mobile device, device capabilities of the mobile device, or a user status of the user.

6. The system of claim 1, wherein the handover plan prioritizes available voice-capable base stations, of the target base stations, on the handover priority list when a type of service, of the mobile device, is a voice service.

7. The system of claim 1, wherein the handover plan prioritizes available data-capable base stations, of the target base stations, on the handover priority list when a type of service, of the mobile device, is a data service.

8. The system of claim 5, wherein the user status comprises a VIP status assigned to at least one of a high-spending customer, a loyal customer, a corporate executive, or a pay-for-upgrade customer.

9. The system of claim 1, wherein the one or more processors are further configured to:
determine that a user status of the user is VIP status; and
perform a VIP action, based on determining that the user status of the user is the VIP status, to free up network resources for the mobile device of the user.

10. The system of claim 9, wherein the VIP action comprises at least one of the following:
migrating other mobile devices, of non-VIP users, to other network resources;
throttling data rate and services available to the other mobile devices of the non-VIP users; or
preventing the other mobile devices, of the non-VIP users, from being moved to the source base station when the source base station is a heavily used cell to which the mobile device is communicatively coupled.

11. The system of claim 1, wherein the mobile device comprises at least one of a desktop computer, a laptop or notebook computer, a tablet computer, a wireless phone, a personal digital assistant (PDA), a multimedia device, a video player, a watch or clock, a gaming device, a navigation device, a television, a printer, an automobile, a fitness device, or a medical device.

12. A method comprising:
identifying, by one or more devices, a neighbors table comprising a handover priority list of target base stations prioritized based on relative signal strength or quality of service of the target base stations;
determining, by the one or more devices, multiple mobile devices that are accessing a network;
determining, by the one or more devices, particular information regarding a mobile device, of the multiple mobile devices, based on historical habits of a user of the mobile device and a current load of a source base station;
determining, by the one or more devices, combined information regarding the multiple mobile devices by combining the particular information with other information regarding one or more other mobile devices of the multiple mobile devices;
determining, by the one or more devices, a handover plan based on the combined information regarding the multiple mobile devices;
updating, by the one or more devices, the handover priority list based on the handover plan; and
managing, by the one or more devices, a handover of the mobile device from the source base station to one of the target base stations based on the updated handover priority list.

13. The method of claim 12,
wherein determining the particular information comprises:
determining the particular information based on the historical habits of the user, the current load of the source base station, and network resources data, and
wherein the network resources data comprises data associated with at least one of base station type, capacity, availability, location or nearness to the mobile device, coverage area, or anticipated usage.

14. The method of claim 12, wherein determining the particular information comprises:
determining the particular information based on the historical habits of the user, the current load of the source base station, and a direction of movement of the mobile device.

15. The method of claim 12, wherein determining the handover plan comprises:
determine that a speed of the mobile device satisfies a speed threshold; and
determine the handover plan that removes or deprioritizes small cell handover from the handover priority list based on determining the speed of the mobile device surpasses a predetermined speed threshold.

16. The method of claim 12,
wherein determining the particular information comprises:
determining the particular information based on the historical habits of the user, the current load of the source base station, and user information, and
wherein the user information comprises at least one of a type of service of the mobile device, a device type of the mobile device, device capabilities of the mobile device, or a user status of the user.

17. The method of claim 12, wherein the handover plan prioritizes available voice-capable base stations, of the target base stations, on the handover priority list when a type of service, of the mobile device, is a voice service.

18. The method of claim 12, wherein the handover plan prioritizes available data-capable base stations, of the target base stations, on the handover priority list when a type of service, of the mobile device, is a data service.

19. The method of claim 16, wherein the user status comprises a VIP status assigned to at least one of a high-spending customer, a loyal customer, a corporate executive, or a pay-for-upgrade customer.

20. The method of claim 12, further comprising:
determining that a user status of the user is VIP status; and
performing a VIP action, based on determining that the user status of the user is the VIP status, to free up network resources for the mobile device of the user.

21. The method of claim 20, wherein the VIP action comprises at least one of the following:
migrating other mobile devices, of non-VIP users, to other network resources;
throttling data rate and services available to the other mobile devices of the non-VIP users; or
preventing the other mobile devices, of the non-VIP users, from being moved to the source base station when the source base station is heavily used cell to which the mobile device is communicatively coupled.

22. The method of claim 12, wherein the mobile device comprises at least one of: a desktop computer, a laptop or notebook computer, a tablet computer, a wireless phone, a personal digital assistant (PDA), a multimedia device, a video player, a watch or clock, a gaming device, a navigation device, a television, a printer, an automobile, a fitness device, or a medical device.

23. A non-transitory computer-readable storage medium storing instructions comprising:
    one or more instructions that, when executed by at least one computer processor, cause the at least one computer processor to:
        identify a handover priority list of target base stations prioritized based on relative signal strength or quality of service of the target base stations in a footprint of a source base station;
        determine multiple mobile devices that are accessing a network;
        determine particular information regarding a mobile device, of the multiple mobile devices, based on historical habits of a user of flail the mobile device and one or more of:
            one or more shortcomings associated with a limited frequency coverage of the mobile device, or
            a current load of the source base station,
                the historical habits including habitual behavior with regard to speed;
        determine combined information regarding the multiple mobile devices by combining the particular information with other information regarding one or more other mobile devices of the multiple mobile devices;
        determine a handover plan based on the combined information regarding the multiple mobile devices;
        update the handover priority list based on the handover plan; and
        manage, based on the updated handover priority list, a handover of the mobile device from the source base station to one of the target base stations.

\* \* \* \* \*

UNITED STATES PATENT AND TRADEMARK OFFICE
CERTIFICATE OF CORRECTION

PATENT NO. : 9,622,124 B2  
APPLICATION NO. : 14/328045  
DATED : April 11, 2017  
INVENTOR(S) : Adam Hamilton et al.

Page 1 of 1

It is certified that error appears in the above-identified patent and that said Letters Patent is hereby corrected as shown below:

In the Claims

Pease correct Claim 23 as follows:

Column 17, Line 19, change "user of flail the mobile device" to --user of the mobile device--

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*